Patented Oct. 16, 1945

2,386,778

UNITED STATES PATENT OFFICE 2,386,778

FRACTIONATION CONTROL

Joseph B. Claffey, Philadelphia, Pa., assignor to The United Gas Improvement Company, a corporation of Pennsylvania Application February 20, 1941, Serial No. 379,745

17 Claims. (Cl. 202—160)

This invention pertains generally to fractionation and pertains particularly to fractionation with high efficiency of separation and high throughput.

It has been found that the efficiency of separation and throughput of fractionating columns in general and packed columns in particular are closely associated with conditions which cause flooding of the columns in that highest efficiencies with highest throughput are obtained just below the flooding point.

Flooding is caused by excessively high vapor velocities which tend to prevent the countercurrent flow of reflux liquid, thus causing reflux liquid to build up in the column and fill its entire space, hence the term "flooding". A result of flooding is a sharp decrease in efficiency and throughput and a sharp increase in pressure drop through the column.

Vapor velocities in the case of distillation are a function of the rate of vapor generation in the still pot.

In my copending application Serial Number 192,197, filed February 24, 1938, which has matured into Patent 2,232,840, dated February 25, 1941, I have described a process and apparatus for the close control of the rate of vapor generation through means responsive to the vapor pressure drop through the column to prevent the column from going into flooding conditions.

Whereas the invention disclosed and claimed in my said copending application is directed to the control of the rate of vapor generation in response to difference in pressure at vertically spaced points in the column, the present application is directed to the general subject matter of regulating the operation of the column by controlling the rate of phase supply (vapor phase and/or liquid phase) in response to difference in pressure at vertically spaced points in the column.

Flooding of a column not only results in a sharp decrease in the efficiency of separation but also upsets equilibrium conditions to such a vast extent that it requires an unusually and inordinately long time to bring the column back to satisfactory operating conditions.

Other things being equal, flooding is a function of two factors as follows: (1) the rate of upward flow of vapors; and (2) the rate of downward flow of liquid whether it be reflux liquid, or feed liquid or a combination thereof, or otherwise.

For efficient fractionation it is desired to bring the liquid and vapor into intimate countercurrent contact under conditions such that descending liquid and ascending vapor are not only in equilibrium with each other but also gradually change in composition along the paths of their flow. Longitudinal diffusion in each phase is preferably reduced to a minimum with maximum diffusion between the two phases. Thus, each phase preferably has an incremental change in composition for each increment of length of contact with the other phase.

Flooding on the other hand goes a long way toward bringing each phase to a homogeneous state which is the direct opposite to what is required for good fractionation.

Furthermore, it is frequently desirable to operate a column at or near its maximum capacity without relation to its maximum efficiency. That is, columns are frequently designed such that for given types of separation the column need not operate under conditions of maximum efficiency provided of course, that flooding conditions are avoided.

Thus, while it is usually desired to maintain the ratio between descending reflux and ascending vapor constant, it is found that this may vary somewhat during a distillation without upsetting equilibrium conditions too greatly for a satisfactory degree of separation.

The same applies to the ratio of feed liquid to ascending vapor in stripping operations.

I have discovered that a column may be satisfactorily operated under conditions of changing rate of vapor generation, whatever the cause may be, by a control of the rate of the flow of liquid to the fractionating system whether said liquid is reflux liquid such as takes place in enriching operations, or feed liquid such as takes place in stripping operations or a combination of the foregoing. Likewise under conditions of changing rate of liquid flow the column operation may be controlled by control of the rate of flow of vapor phase, by controlling the rate of vapor phase generation as described and claimed in my above copending application or by other methods. For example, vapor flow control means might be interposed between a still in which the vapor phase is generated and the fractionating column. As a further example of other methods of the control of the flow of vapor phase in the fractionation of fluids such as natural gas, refinery oil gas, air and the like, a still is unnecessary and the rate of flow of the vapor phase may be controlled by control of valves in connections supplying the vapor phase to the column.

In this connection the term fractionating system in the specification and claims is intended to comprise a fractionating column and a still in cases in which a still is necessary.

In accordance with one aspect of my invention, if a column in its operation reaches incipient flooding conditions due to an increase in the rate of vapor phase generation, the ratio of downwardly flowing liquid to upwardly flowing vapor is automatically decreased to avoid flooding and as the condition which caused the increase in vapor phase generation passes is automatically increased back to the desired ratio.

Changes in the rate of vapor phase generation may be the result of any one or more causes. For example, (1) in either batch or continuous operation, a variation in heat input into the still; (2) in batch operation changes in vapor volume due to changes in the composition of the still liquid as the distillation proceeds; (3) in continuous operation changes in vapor volume due to changes in the rate of feed; (4) in continuous operation changes in vapor volume due to changes in composition of the feed; and/or (5) in continuous or batch operation changes in vapor volume resulting from changes in quantity of reflux returned to the column.

In accordance with my invention, I am able to continuously operate throughout a distillation, whether batch or continuous, without danger of flooding by controlling the rate of liquid flow to the fractionating system through means responsive to the vapor pressure drop between vertically spaced points in said system.

The vapor pressure drop may be utilized to control the rate of reflux liquid flow, and/or feed liquid flow to any desired portion of the fractionation system. For example the vapor pressure drop may be utilized to control the rate of reflux liquid flow to the top of the column and/or to any point or points intermediate the length of the columns, and/or the vapor pressure drop may be utilized to control the flow of feed liquid to the top of the column, and/or to a point or points intermediate the length of the column and/or to the bottom of the column as for example to the still.

Except in the case of the control of the flow of feed liquid to the still, a direct control is exercised on the downward flow of liquid through at least a portion of the column.

In the case of the control of the flow of feed to the still the downward flow of liquid in the column may be affected indirectly, while the rate of vapor generation is more directly affected.

Other features of the invention reside in the construction, arrangement and combination of parts and in the steps, combinations of steps and sequences of steps all of which together with other features will become more apparent to persons skilled in the art as the specification proceeds and upon reference to the drawings in which.

For convenience in description vapor pressure drop and difference in vapor pressure will be hereinafter referred to in the specification and the claims simply as pressure drop and difference in pressure.

Figure 1:
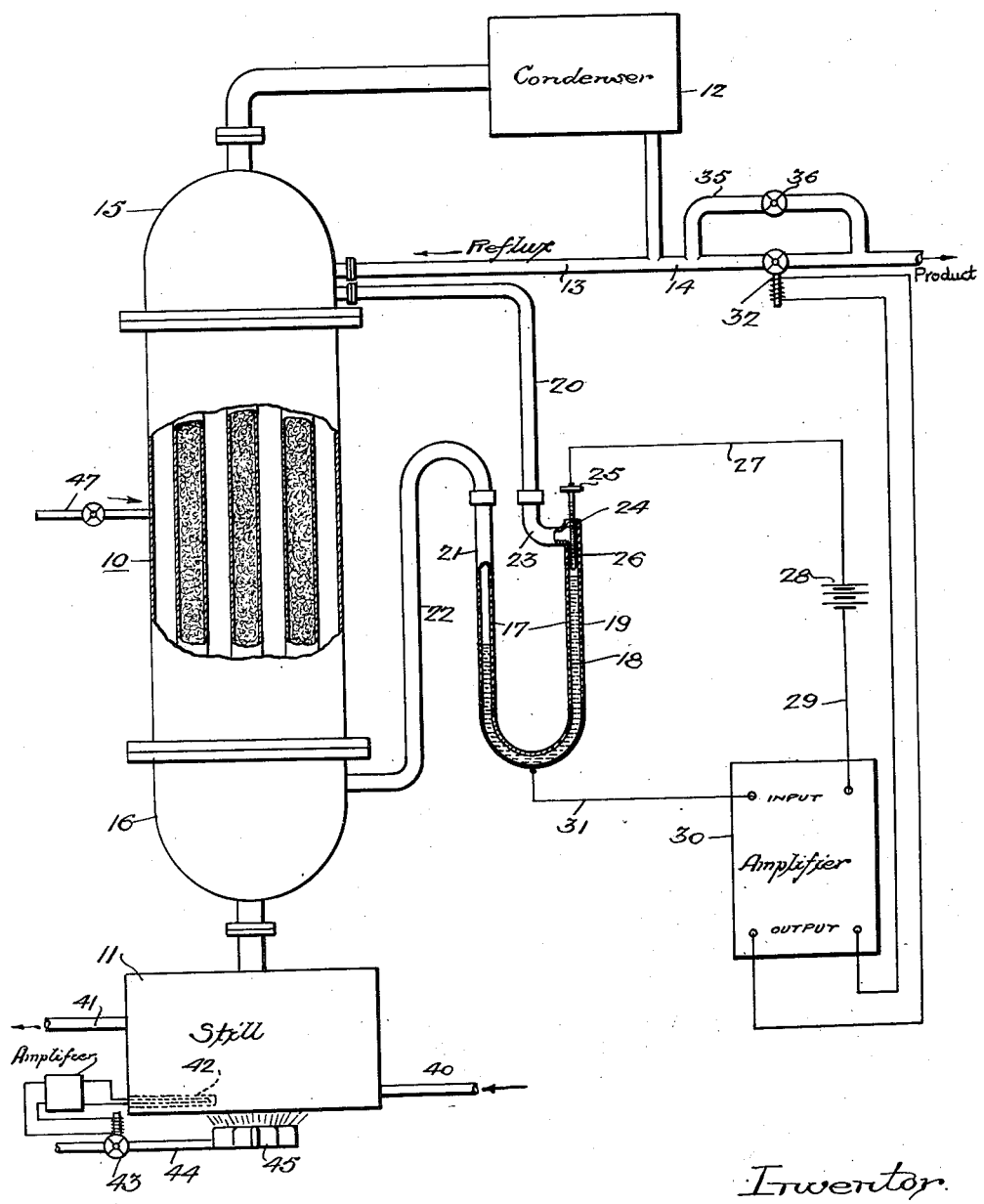
Figure 1 is an elevation, partly in section, and partly diagrammatical illustrating one form of the invention.

Referring now more particularly to Figure 1, at 10 is shown a column which has been represented as being of the multi-tubular packed type. Tubular columns usually comprise a plurality of of tubes connected in parallel and packed with a suitable phase contacting medium, although single tube packed columns are frequently used. The invention, however, while particularly adapted to packed columns, is also applicable to distillation columns in general including those of the bubble cap type.

At 11 is conventionally represented a still for column 10 and at 12 a condenser with reflux and product lines 13 and 14 respectively.

The apparatus so far particularly described may be conventional in character and may be of any design or construction known in the art. Likewise, it may be operated in any desired manner or for any desired purpose.

In the operation of column 10, assuming constant downward flow of liquid, the pressure drop from the bottom to the top or, in other words, between chambers 16 and 15, will vary with the rate of vapor flow up through the column, increasing with increase in vapor flow up to the flooding point. When the flooding point is reached, the pressure drop increases very sharply.

Likewise, in the operation of column 10, assuming constant upward flow of vapor, the pressure drop from the bottom to the top, or in other words, between chambers 16 and 15, will vary with the rate of liquid flow down through the column, increasing with increase in liquid flow up to the flooding point. When the flooding point is reached, the pressure drop increases very sharply.

If the vapor pressure at the column outlet is constant the rate of vapor flow is determined by the pressure in still 11, which in turn is determined by the rate of vapor generation, which as previously pointed out, may be a function of several factors including (1) heat input; (2) change in liquid composition; (3) in continuous operation a change in liquid feed; or (4) any combination of the foregoing; or (5) any other cause.

In accordance with this invention, I vary the rate of downward flow of liquid through the column with variation in pressure drop through the column, decreasing the rate of downward flow of liquid when the pressure drop approaches flooding conditions and increasing the rate of downward flow of liquid when the pressure drop recedes from flooding conditions.

Thus, flooding conditions in the column and the delays and other undesirable results thereof are avoided.

In fact, if desired, the operation of the column may be kept in the neighborhood of incipient flooding without actually going into a flooding state under which conditions the column will operate at maximum capacity for the type of separation being effected with highest efficiency, taking into consideration any loss of efficiency due to changing rate of vapor flow and consequent changes in the rate of liquid flow automatically effected in accordance with my invention to avoid flooding.

While means for causing the downward flow of liquid to vary with the pressure drop may be of any construction suitable for the purpose, I find it convenient for the purpose of illustration to show a U-tube 17 partly filled with mercury 18 and having one arm 19 connected to chamber 15 as illustrated at 20 and another arm 21 connected to chamber 16 as illustrated at 22.

Arm 19 is shown with a set-off portion 23 through the wall of which extends internally threaded boss 24 which in turn accommodates an externally threaded adjustable element 25 having an end 26 extending downwardly into arm 19.

End 26 is connected through boss 24 and wire 27 to one side of a source of electrical energy 28, the other side of which is connected through wire 29 to one terminal of the input of an amplifier 30. The other input terminal of amplifier 30 is connected through wire 31 to mercury 18 in U-tube 17.

The output of amplifier 30 is connected to a solenoid valve 32 in product line 14.

It is convenient to provide a bypass 35 around valve 32, flow through said bypass controlled by a valve 36.

The operation of the form of the invention shown in Figure 1 is as follows:

The still, column and conventional appurtenances being in operation, the height at which the mercury 18 will stand in arm 19 will be determined by the difference in pressures between chambers 16 and 15, or in other words, the drop in pressure from chamber 16 to chamber 15. This height will increase and decrease with increase and decrease in such pressure drop.

Element 25 is so adjusted as to bring end 26 to a position in arm 19 such that it will be contacted by the rise of mercury in arm 19 when the pressure drop reflects an increase in the rate of vapor flow beyond that which is desired, for example a rate which reflects flooding or incipient flooding conditions.

A circuit is thus closed through the input of amplifier 30 causing current to flow through its output circuit to operate valve 32 to increase the flow of product in product line 14 and thus decrease the flow of reflux in reflux line 13.

The downward flow of liquid in column 10 is thus decreased with consequent decrease in the chances of flooding.

With restoration of a desired rate of vapor flow, or with a decrease in the rate of vapor flow however caused, the mercury in arm 19 will fall due to the resulting decrease in pressure drop to break the circuit through the input of amplifier 30 whereupon its output circuit will be de-energized and valve 32 will again close (partially or wholly according to its operation).

Valve 32 may be of such capacity when fully opened as to draw off as product a major part of the condensate flowing from condenser 12, a condition which would cause the column 10 to recede somewhat from flooding conditions. The repeated momentary closing or partial closing (according to the type of valve chosen) of valve 32 cuts down the flow of product and increases the flow of reflux sufficiently so as to obtain the desired average flow for the type of separation being made.

When bypass 35 is employed valve 36 is adjusted so that the flow of product through the bypass is somewhat less than required for normal operation. In this case valve 32 controls the flow of additional product required to maintain the desired relationship between the downwardly flowing liquid and upwardly flowing vapor in column 10. This arrangement may be availed of to free large surges in the flow of product.

It will, of course, be understood that the connections to the column 10 may be reversed so that the mercury will descend in arm 19 with increase in pressure drop. In this case, breaking of the circuit through the amplifier will open valve 32. Valve 32 in this case will be of a type which opens when not energized.

While I have particularly described a means for controlling the rate of flow of reflux utilizing variation in pressure drop through the column 10, it is to be understood that this is solely for the purpose of illustration and that any other means for the control of the rate of flow of reflux utilizing the pressure drop through the column or any section or any part thereof, might be substituted without departing from the spirit of the invention.

Figure 2:
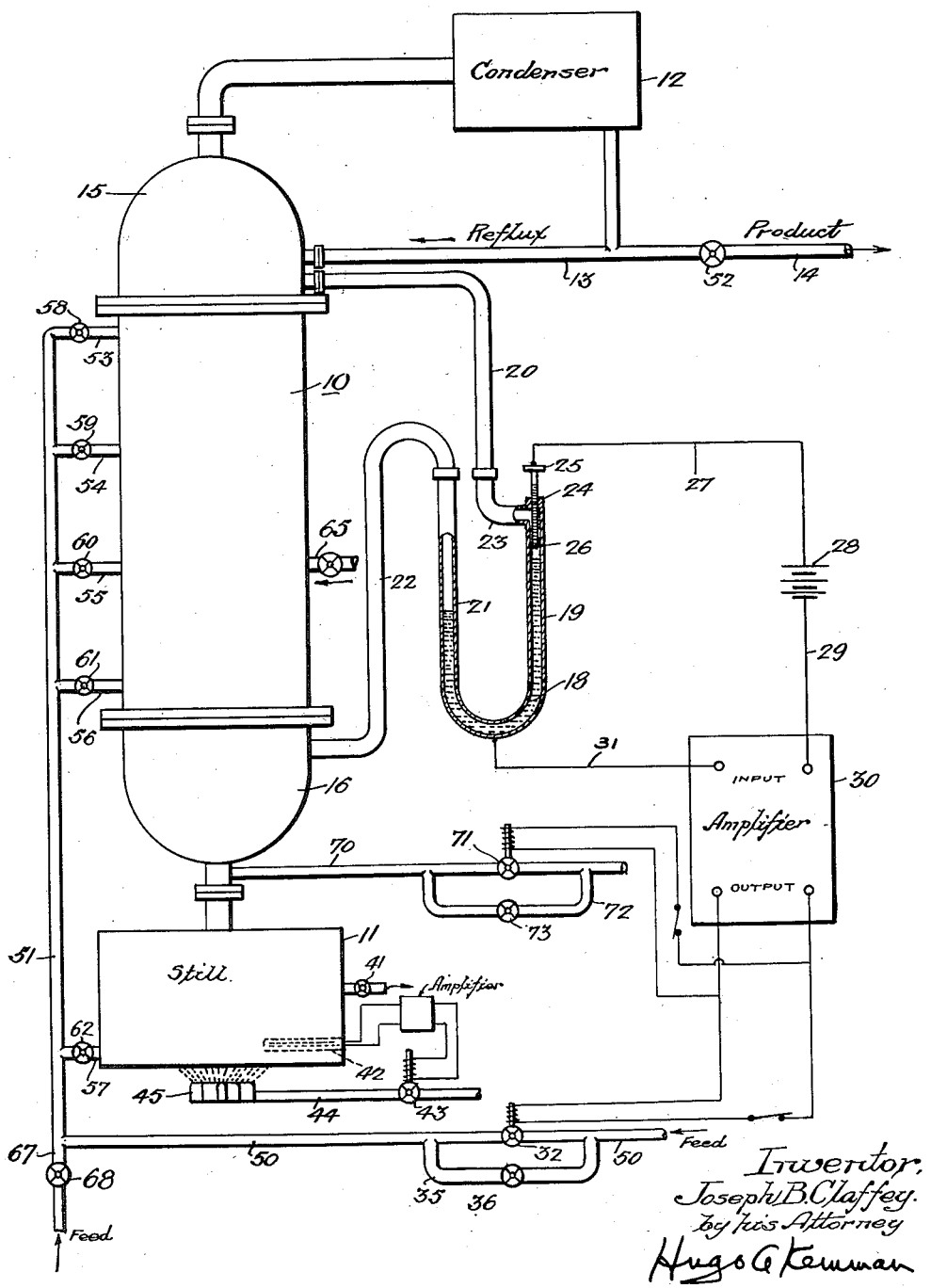
Figure 2 is an elevation, partly in section and partly diagrammatical, illustrating another form of the invention.

Thus, the mechanism shown in either Figure 2 or Figure 3 of my above mentioned patent might be substituted or any other specific mechanism might be chosen or devised.

Likewise, any other means for controlling the reflux ratio, that is, the ratio of reflux to product utilizing variation in pressure drop either through the column or any section or part thereof, might be employed.

For example, the valve mechanism described in connection with product line 14 might be installed in reflux line 13 in which case line 14 might be made to discharge under a somewhat higher pressure than line 13 or otherwise to insure that the rate of flow of reflux will increase and decrease with the opening and closing of the valve 32.

Instead of returning reflux to the top of the column, it might be returned to any point or points intermediate the ends of the column, and the rate of reflux flow to said point or points controlled in response to column pressure drop. Also product side streams may be taken off from the column at any desired point.

Many other variations will suggest themselves to persons skilled in the art upon becoming familiar herewith.

From the foregoing description, it will be noted that still 11 may be operated either as a batch still or as a continuous still.

If operated as a continuous still an inlet 40 and an outlet 41 might be conveniently provided and if it is desired to maintain the still at a constant temperature this might be accomplished through the use of a thermocouple 42 for the control of valve 43 in line 44 feeding liquid fuel to burner 45. If the source of heat is electrical valve 43 would have its equivalent in the form of a switch or rheostat, or otherwise in a circuit leading to the electrical heating element, or if a solid fuel burner is employed thermocouple 42 might control the solid fuel burner by controlling the operation of a blower, or otherwise, all of which will be understood by persons skilled in the art upon becoming familiar herewith.

While it is usually conventional to return reflux to the top of a column, it will be understood that my invention may be employed to return condensate or reflux to any other point or points if and as desired.

Thus my invention may be adapted to any form of operation wherein vapor is removed from the column either overhead or otherwise, such as in a side stream, said vapor condensed and a part or parts thereof returned to the column at one or more parts for downward flow therethrough.

As previously pointed out my invention is adapted to any type of operation, for example, either enriching operations, or stripping operations or combinations thereof. For the latter purpose, I have illustrated an inlet at 47 for feed liquid.

The adaption of the invention to stripping operations and combined enriching and stripping operations is more particularly illustrated in Figure 2 wherein the apparatus of Figure 1 is for the most part duplicated.

In Figure 2, valve 32 with the associated bypass 35 and valve 36 are shown in feed line 50 which leads to manifold 51 and the product line 14 is shown with a conventional valve 52.

Manifold 51 is illustrated as connected to column 10 at a plurality of vertically spaced points which have been numbered 53, 54, 55 and 56, although it is to be understood that the connection or connections may be at any other point or points or plurality of points, if desired.

Manifold 51 is also illustrated as connected to still 11 at 57.

Connections 53, 54, 55, 56 and 57 are illustrated as controlled by valves 58, 59, 60, 61 and 62, respectively.

The operation of the apparatus of Figure 2 so far described is as follows.

For a stripping operation valve 58 would be opened and valves 54 to 57 inclusive would be closed. The feed liquid flows through feed line 50 through valve 32 (and bypass 35 and valve 36 if employed), into manifold 51, and into column 10 through connection 53, the feed liquid flowing down through the column and into still 11 in the usual way.

In flowing down through the column the feed liquid is contercurrently contacted by vapor phase generated in still 11 and is stripped of its lighter components which are carried overhead to condenser 12, condensed and taken off through product line 14 with or without a part returned to the column 10 through reflux line 13.

Valve 32 as illustrated is connected to the output of amplifier 30 in the same manner as in Figure 1 and is controlled by the pressure drop in column 10.

An increase in pressure drop beyond the desired or selected value causes valve 32 to function to restrict the feed flowing to the column through connection 53 and a fall in pressure drop below the selected or desired value causes valve 32 to increase the feed flowing to connection 53.

Flooding of the column is thus very effectively avoided, and/or the flow of increased volumes of vapors is not unnecessarily restricted.

For combined stripping and enriching operations the feed to the column may be through any one or more of the connections 54, 55 and 56, or their equivalent or equivalents.

Flooding is avoided by causing the rate of feed to decrease and increase with increase and decrease respectively in the pressure drop in column 10 from the chosen value.

For enriching operations connection 57 leading directly to still 11 is provided. When valve 62 is open and valves 58 to 61 closed, all of the feed liquid goes directly to the still 11 in which case the rate of feed to still 11 and in turn the rate of vapor phase generation is made to follow the pressure drop, decreasing and increasing with increase and decrease respectively in pressure drop.

It will, of course, be understood that if desired, for any reason, the feed may enter the system at two or more points by opening any two or more of the valves 58 to 62 to any desired extent. Regardless of what might take place within the system as a result of such multiple feeding, the rate of feed is controlled through the pressure drop and a desired or selected pressure drop may be more or less closely maintained. Flooding is avoided because the feed is restricted before flooding can take place. The degree to which flooding is avoided and the safety factor, if any, employed depends upon the adjustment at 25 or its equivalent in any pressure responsive mechanism that might be substituted.

My invention is also adapted to the feeding to a fractional distillation system of two or more liquids of different composition.

For example, let us assume that a liquid of a given composition is fed to the tower 10 at 65 in Figure 2, although conceivably such feed may be at any other point or points, for example, directly into still 11.

The point of feed of the second liquid will usually depend upon the relative vapor pressures of the two feed liquids, the liquid of higher vapor pressure being customarily fed into the system at a higher point.

Thus, if the second liquid has a higher vapor pressure than the first which is being fed in at 65, the feeding point of the second liquid will usually be at a higher point such as at 53 or 54, or any other higher point or points.

On the other hand, if the vapor pressure of the second liquid is lower than that of the first, the feeding of the second liquid will usually be at a lower point such as 55, 56, or 57 or at any other point or points.

If the connection 65 is made directly to still 11, it will generally be utilized for feeding the liquid of lower vapor pressure, and any one or more of the connections 53 to 57 or their equivalent may be utilized to feed the liquid of higher vapor pressure. Thus, if desired both liquids may be fed directly into still 11.

On the other hand, if connection 65 is made at the top of column 10, for example, at a point comparable to that of connection 53, it will be usually utilized for feeding the liquid of higher vapor pressure in which case any one or more of connections 53 to 57 or their equivalent may be utilized to feed the liquid of lower vapor pressure.

It will, of course, be understood that valve 32 or its equivalent, may be employed to control only a part of the feed to manifold 51.

For example, I have illustrated in Figure 2 a second feed line 67 leading to manifold 51 and controlled by valve 68.

The feed liquid flowing through line 67 may be of the same or of a composition different from the feed through line 50.

In either case, the rate of feed through line 67 is below the desired total and the make-up is made through line 50, the flow through line 50 being controlled by the pressure drop in column 10.

When the two feed liquids are of different composition, I frequently desire to feed the liquid of higher vapor pressure through line 50 since it has a greater effect upon the rate of vapor phase generation and, in turn, the pressure drop. Having a greater influence upon the pressure drop, I find it advantageous to have this feed liquid controlled by the pressure drop.

The two feed liquids are, of course, more or less mixed in manifold 51 and the mixture may be fed to the system at any one or more of the points 53 to 57 or at any other point or points.

Although any desired means may be employed for the generation of vapor phase in still 11, I have shown the thermocouple 42, valve 43, line 44 and burner 45 described in connection with Figure 1 merely for the purposes of illustration. In both Figure 1 and Figure 2, I frequently prefer when operating continuously to employ temperature regulating mechanism to hold the temperature in the still more or less constant. This is particularly advantageous for many purposes.

It will, of course, be understood that a plurality of stills with accompanying fractionating columns may be connected in a series, with or without intermediate surge tanks to take care of irregularities in flow from one still to the next.

In Figure 2 the division between reflux and product may be accomplished in any desired manner known in the art, I having shown merely for the purposes of illustration a conventional valve 52.

It will be understood that the control of product and thus of reflux illustrated in Figure 1 might be added to Figure 2, appropriate connections being made to amplifier 30, in which case both the reflux and the feed liquid would be simultaneously controlled by the pressure drop in column 10.

The proper connections to amplifier 30 would be immediately obvious to persons skilled in the electrical art. For example, the operating terminals of the two valves 32 might be connected in parallel across the output of the amplifier. On the other hand, they might be connected in series across said output.

In the case of fractionating fluids such as natural gas, refinery oil gas, air and the like which are already in the vapor phase, a still is not necessary.

In such case, the vapor phase might be admitted through line 70 controlled by solenoid valve 71. Line 70 may be provided with the bypass 72 controlled by valve 73.

The solenoid valve 71 is shown controlled from the amplifier 30 in response to column pressure drop variations in the same manner as valve 32. Thereby, the supply of vapor phase to the column may be controlled in response to changes in column pressure drop, decreasing the flow of vapor phase to the column in response to an increase in pressure drop and vice versa, so that the column may, if desired, be maintained at a condition just below incipient flooding.

It will be obvious to those skilled in the art that the various controls may be combined in any desired manner, for example, column pressure drop might be utilized to control simultaneously vapor phase supply and liquid phase supply, the latter either as reflux or feed liquid, or both.

Many other variations will occur to persons skilled in the art upon becoming familiar with this invention.

A fundamental feature of similarity in various forms of the invention described resides in the control of at least one phase flowing to the distillation system, whether said phase be reflux liquid or feed liquid, or vapor, and utilizing pressure drop in the column to effect said control.

Reference is made to my copending application Serial Number 192,197, filed February 24, 1938, which has matured into Patent Number 2,232,840, dated February 25, 1941, wherein the utilization of difference in pressure between vertically spaced points along a column to control the rate of vapor phase generation is described and claimed.

Particular reference has been made herein to the control of phase supply to avoid column flooding, and to permit operation immediately below incipient flooding conditions. It is not intended that this invention shall be so limited. Under some circumstances it might be desirable to operate under conditions far removed from those which would cause flooding. Control of phase supply, for any reason, in response to variation in column pressure drop is within the scope of the invention.

In the drawings and in the foregoing description, a mercury switch is shown and described as the means for controlling supply of vapor and/or liquid phases. It will be obvious to those skilled in the art upon becoming familiar with this invention that many other means might be employed, for example, actuation of the valves might be provided by a diaphragm responsive to variations in column pressure drop and employed to actuate the supply valves by pneumatic or hydraulic means, or otherwise. Many other modifications of the actuating means shown will occur to those skilled in the art without departing from the spirit of this invention.

In the specification and in the drawings the average pressure drop of a plurality of fractionating tubes is described and shown as the controlling influence. It will be obvious to those skilled in the art upon becoming familiar with this invention that the pressure drop in or across individual tubes in a column might be employed instead of the average pressure drop.

It will be understood that the particular description is by way of illustration and that changes, omissions, additions, substitutions and/or modifications might be made within the scope of the claims without departing from the spirit of the invention which is intended to be limited only as required by the prior art.

I claim:

1. Apparatus for the fractionation of a fluid mixture containing components of different volatilities, comprising a column for the countercurrent contact of ascending vapor phase with descending liquid phase, means for supplying vapor phase to said column, means for supplying liquid phase to said column and means actuated by difference in pressure of said vapor phase between vertically spaced points in said column for controlling the rate of phase supply to said column supplied by at least one of said phase supply means.

2. Apparatus for the fractionation of a fluid mixture containing components of different volatilities, comprising a column for the countercurrent contact of ascending vapor phase with descending liquid phase, means for supplying vapor phase to said column, means for supplying liquid phase to said column and means actuated by difference in pressure of said vapor phase between vertically spaced points in said column for controlling the rate of phase supply to said column supplied by at least one of said phase supply means in a manner to maintain said rate of phase supply immediately below that which would cause flooding.

3. Apparatus for the fractionation of a fluid mixture containing components of different volatilities, comprising a fractionation system including a column for the countercurrent contact of ascending vapor phase with descending liquid phase, means for supplying vapor phase to said column, means for supplying liquid phase to said system and means actuated by difference in pressure of said vapor phase between vertically spaced points in said column for controlling the rate of liquid supply to said system supplied by said liquid phase supply means.

4. Apparatus for the fractionation of a fluid mixture containing components of different volatilities, comprising a fractionation system including a column for the countercurrent contact of ascending vapor phase with descending liquid phase, means for supplying vapor phase to said column, means for supplying liquid phase to said system and means actuated by difference in pressure of said vapor phase between vertically spaced points in said column for controlling the rate of vapor supply to said column supplied by said vapor phase supply means.

5. Apparatus for the fractionation of a fluid mixture containing components of different volatilities, comprising a column for countercurrent contact of ascending vapor phase with descending liquid phase, means for supplying vapor phase to said column, means for supplying liquid phase to said column comprising means for supplying reflux, and means actuated by difference of pressure of said vapor phase at vertically spaced points in said column for controlling the rate of reflux supply to said column supplied by said means for supplying said reflux.

6. Apparatus for the fractionation of a fluid mixture containing components of different volatilities, comprising a fractionation system including a column for the countercurrent contact of ascending vapor phase with descending liquid phase, means for supplying vapor phase to said column, means for supplying liquid phase to said system comprising means for supplying feed liquid, and means actuated by difference in pressure of said vapor phase between vertically spaced points in said column for controlling the rate of feed liquid supply supplied by said means for supplying feed liquid.

7. Apparatus for the fractionation of a fluid mixture containing components of different volatilities, comprising a fractionation system including a column for the countercurrent contact of ascending vapor phase with descending liquid phase, means for supplying liquid phase to said column, means for supplying vapor phase to said column including a still, means for supplying feed liquid to said still, and means actuated by difference in pressure of said vapor phase between vertically spaced points in said column for controlling the rate of feed liquid supply to the said still supplied by said means for supplying feed liquid.

8. Apparatus for the fractionation of a fluid mixture containing components of different volatilities, comprising a column for countercurrent contact of ascending vapor phase and descending liquid phase, means for supplying vapor phase to said column, means for supplying liquid phase to said column, and means responsive to variations in difference in pressure of said vapor phase between vertically spaced points in said column for inversely varying the rate of phase supply to said column supplied by said means for supplying liquid phase.

9. In a process for the fractionation of a fluid mixture containing components of different volatilities wherein ascending vapor phase is countercurrently contacted with descending liquid phase in a phase contacting column, the step of utilizing variation in difference in pressure of said vapor phase between vertically spaced points along said column to inversely vary the rate of supply of at least one of said phases to said column.

10. In a process for the fractionation of a fluid mixture containing components of different volatilities, wherein vapor phase is generated in a still and ascending vapor phase countercurrently contacted with descending liquid phase in a phase contacting path, said still and said path constituting a fractionating system, the step of utilizing difference in pressure of said vapor phase between vertically spaced points along said phase contacting path to control the rate of supply of liquid phase to said system.

11. In a process for the fractionation of a fluid mixture containing components of different volatilities wherein ascending vapor phase is countercurrently contacted with descending liquid phase in a phase contacting column, the step of utilizing variation in difference in pressure of said vapor phase between vertically spaced points along said column to inversely vary the rate of supply of said vapor phase to said column.

12. In a process for the fractionation of a fluid mixture containing components of different volatilities wherein ascending vapor phase is countercurrently contacted with descending liquid phase in a phase contacting column, the step of utilizing variation in difference in pressure of said vapor phase between vertically spaced points along said column to inversely vary the rate of supply of said liquid phase to said column.

13. In a process for the fractionation of a fluid mixture containing components of different volatilities wherein ascending vapor phase is countercurrently contacted with descending liquid phase including reflux liquid in a phase contacting column, the step of utilizing variation in difference in pressure of said vapor phase between vertically spaced points along said column to inversely vary the rate of supply of said reflux liquid to said column.

14. In a process for the fractionation of a fluid mixture containing components of different volatilities wherein ascending vapor phase is countercurrently contacted with descending liquid phase including feed liquid in a phase contacting column, the step of utilizing variation in difference in pressure of said vapor phase between vertically spaced points along said column to inversely vary the rate of supply of said feed liquid to said column.

15. In a process for the fractionation of a fluid mixture containing components of different volatilities wherein ascending vapor phase is countercurrently contacted with descending liquid phase in a phase contacting column, the step of utilizing variation in difference in pressure of said vapor phase between vertically spaced points along said column to inversely vary the rate of supply of at least one of said phases to said column to maintain the flow of said controlled phase below that which would cause flooding.

16. In a process for the fractionation of a fluid mixture containing components of different volatilities wherein ascending vapor phase is countercurrently contacted with descending liquid phase in a phase contacting column, the steps of generating a vapor phase, and utilizing variation in difference in pressure of said vapor phase between vertically spaced points along said column to inversely vary the rate of supply of said generated vapor phase to said column.

17. In a process for the fractionation of a fluid mixture containing components of different volatilities wherein ascending vapor phase is countercurrently contacted with descending liquid phase in a phase contacting column, the step of utilizing variation in difference in pressure of said vapor phase between vertically spaced points along said column to inversely vary the rate of supply of a previously generated vapor phase to said column.

JOSEPH B. CLAFFEY.